March 1, 1960  J. H. ZILLMAN ET AL  2,926,692
CHECK VALVE
Filed Dec. 18, 1956  2 Sheets-Sheet 2
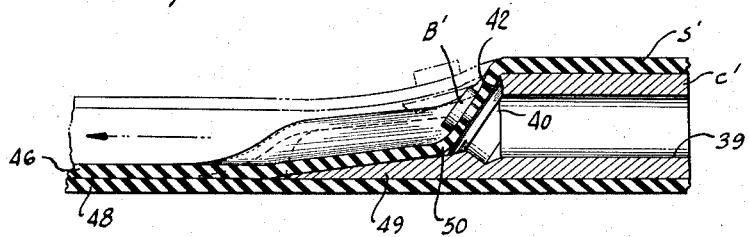
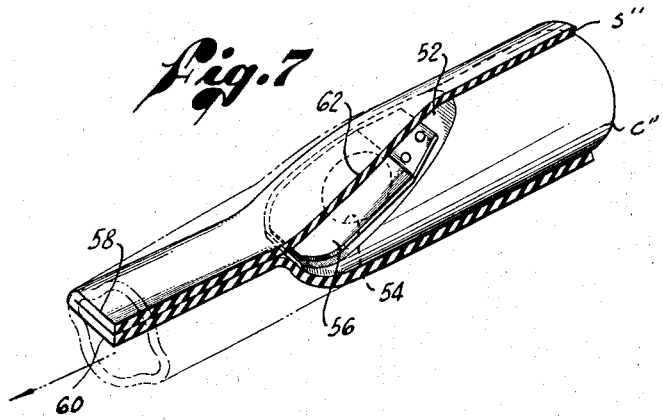
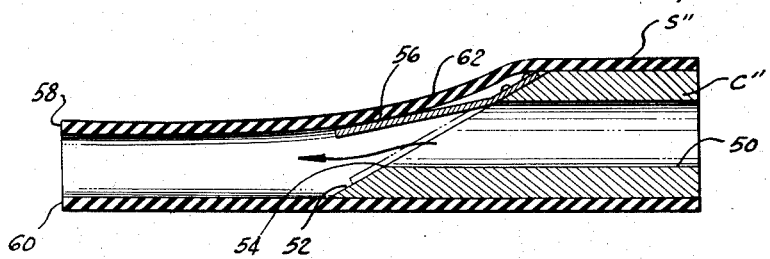
INVENTORS
JACK H. ZILLMAN
GLYNN H. WILLIAMS
BY
Fulwider Mattingly & Huntley
ATTORNEYS

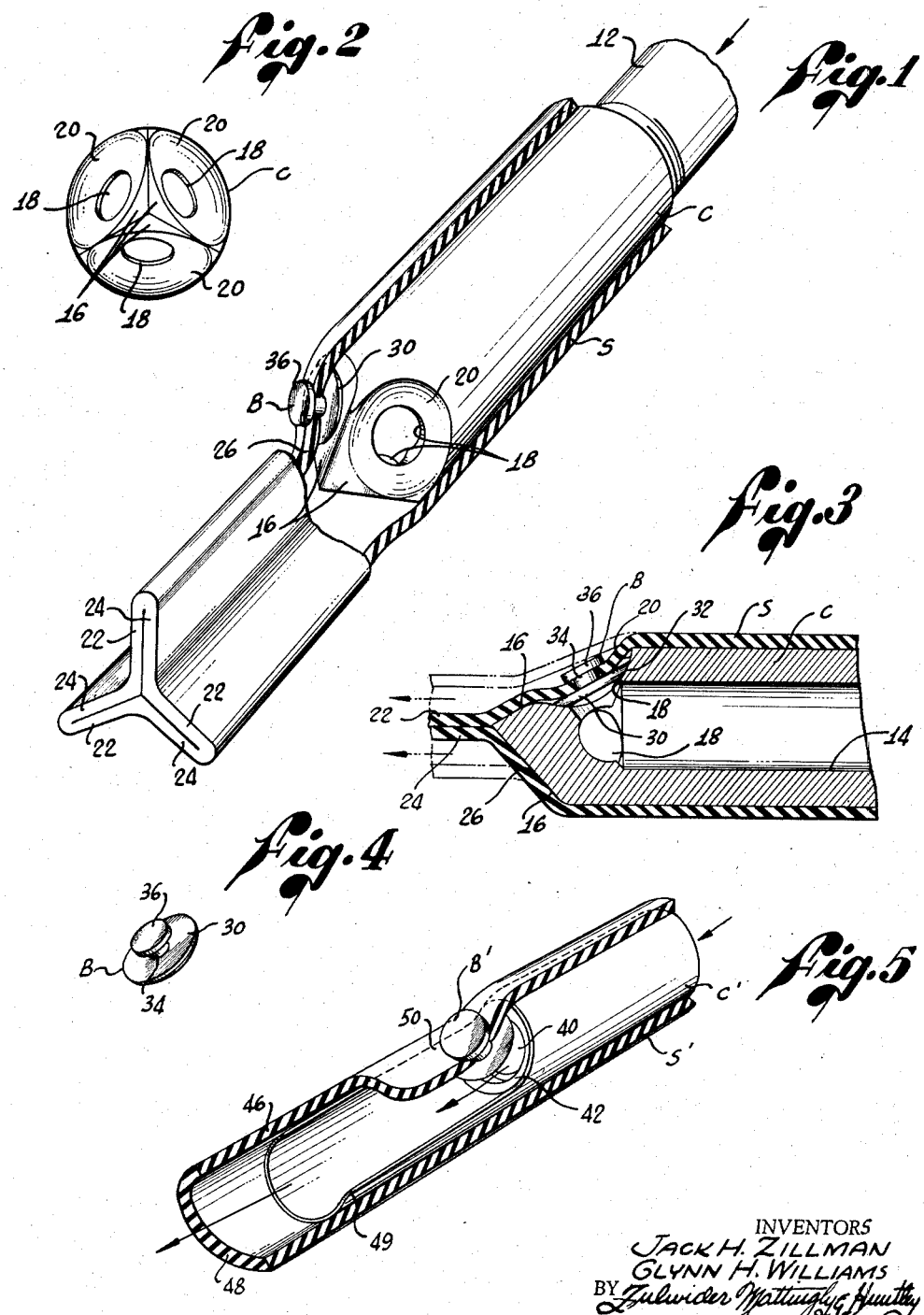

United States Patent Office 2,926,692
Patented Mar. 1, 1960

2,926,692

CHECK VALVE

Jack H. Zillman, Redondo Beach, and Glynn H. Williams, Huntington Park, Calif., assignors to U.S. Industries, Inc., a corporation of Delaware Application December 18, 1956, Serial No. 629,152

7 Claims. (Cl. 137—512)

The present invention relates generally to the field of valves and more particularly to a new and improved check valve.

Where conventional heretofore-proposed check valves are arranged with their discharge side exposed to a comparatively high fluid pressure, backflow through the valve often occurs. This is especially true after the check valve has been in service for some time. When such backflow takes place, it becomes necessary to replace the check valve. Such replacement often presents a time-consuming and expensive problem, as for example where the check valve constitutes a part of a subterranean oil or water well pump.

It is a major object of the present invention to provide a check valve that is especially adapted for use under conditions of high fluid pressures.

Another object is to provide a check valve that will remain free of backflow over extended periods of time and hence will not necessitate other than infrequent repair or replacement.

A further object of the invention is to provide a check valve that is especially adapted for use with liquids containing solid materials, as for example sand or grit.

An additional object is to provide a check valve which is extremely simple in design and rugged of construction whereby it may afford a long and useful service life.

Yet a further object is to provide a check valve which is economical to construct as compared to conventional check valves, the check valve of the present invention readily lending itself to mass production methods.

Another object of the invention is to provide a check valve having a maximum fluid capacity for its size and weight.

It is a more particular object of the invention to provide a check valve employing a rigid core formed with a fluid outlet, a flexible self-closing lip-type sealing member on the core and unique means for preventing extrusion of the sealing member into the fluid outlet during the time the pressure exteriorly of the check valve exceeds the internal pressure to which it is subjected.

These and other objects and advantages of the present invention will become apparent from the following detailed description when taken in conjunction with the appended drawings wherein:

Figure 1 is a perspective view that is partially broken away, disclosing a first form of check valve embodying the present invention, said valve being shown in closed position;

Figure 2 is a front view of a core member utilized with said check valve;

Figure 3 is a fragmentary central sectional view of said check valve;

Figure 4 is a perspective view of a closure element employed with said check valve;

Figure 5 is a perspective view that is partially broken away disclosing a second form of check valve embodying the present invention, said valve being shown in open position;

Figure 6 is a fragmentary central sectional view of said second form of check valve;

Figure 7 is a perspective view that is partially broken away disclosing a third form of check valve embodying the present invention; and Figure 8 is a central sectional view of said third form of check valve.

Referring to the drawings and particularly Figures 1 through 4 thereof, the first form of check valve embodying the present invention includes a generally cylindrical body or core C. This body or core C is of hollow construction and is formed of a rigid material such as metal. The rear end of the core C is secured to an inlet pipe 12. As indicated in Figure 3, the core C is formed with an axially extending fluid passage 14, the rear end of which receives flow through the pipe 12. The front end of the core C is formed with three radially inwardly and forwardly extending side walls each of which are designated 16. These side walls 16 are of equal dimension and each is formed with an outlet aperture 18. These outlet apertures 18 are of equal area and connect the front end of the fluid passage 14 with the space encompassing the core C. As indicated particularly in Figure 3, a coaxial inwardly-cupped annular cavity or seat 20 encompasses each of the outlet apertures 18.

A flexible sealing member S is attached to the core C, the rear portion of this sealing member S being generally tubular so as to be telescopically received by the external walls of the core. The front portion of the sealing member S is formed with three pairs of lips each pair being designated 22 and 24. The rear portion of the lips 22 and 24 merge into a radially outwardly and rearwardly tapered intermediate section 26. The intermediate sections 26 closely overlie the side walls 16 of the core C in the relaxed condition of the sealing member. Preferably, the sealing member S will be of a natural or synthetic rubber material and will be so formed that in their relaxed position each of the pairs of lips 22 and 24 will be in abutting relationship, as indicated in Figure 1.

A closure element or button B is provided for each of the outlet apertures 18. As indicated in Figures 3 and 4, the closure buttons B each include a disc 30, the peripheral edge 32 of which is curved complementary in profile to the curvature profile of the seat 20 of the core C. A coaxial stem 34 is integrally formed on the disc 30. A head 36 is formed at the end of the stem 34 opposite the disc 30. Preferably, the three closure buttons B will be integrally molded into the intermediate sections 26 of the sealing members S in alignment with the outlet apertures 18.

In the operation of the first form of check valve, assuming the exterior or downstream side of the valve to be exposed to a body of fluid existing at a pressure higher than that within the fluid passage 14, each of the pairs of lips 22 and 24 will be maintained tightly pressed together by the pressure differential. Additionally, the closure buttons B will be held firmly seated against their complementary cavities or seats 20. Referring to Figure 3, it should be particularly observed that during this condition the closure buttons B will serve to positively restrain squeezing of the intermediate sections 26 of the sealing member S into the outlet apertures 18. Accordingly, these closure buttons B will prevent damage to the sealing S from such extrusion. When the fluid pressure within the fluid passage 14 is increased over that of the fluid surrounding the check valve, outward fluid flow through the apertures 18 will take place. Such outward flow will lift the closure buttons B off their seats 20 and effect the opening of the pairs of lips 22 and 24 so as to permit fluid to pass outwardly through the front ends of these lips as indicated by the phantom lines in Figure 3. Such fluid flow will continue until the pressure within the fluid passage 14 again falls below that of the fluid surrounding the check valve. The sealing member S and its closure buttons B will then return to their original positions.

Referring now to Figures 5 and 6, there is shown a second form of check valve embodying the present invention. In this form, the core C' is formed with an axially extending fluid passage 39. This passage 39 terminates adjacent the front end of the core C' in an inclined outlet aperture 40. This outlet aperture 40 is encompassed by a generally cup-shaped cavity or seat 42. Forwardly of the outlet aperture 40, the core C' is formed with a scoop 49 that tapers forwardly and radially outwardly.

The sealing member S' of the second form of check valve has a rear portion which is generally tubular in configuration so as to telescopically encompass the core C'. The front end of the sealing member S' is formed with a pair of sealing lips 46 and 48, while its intermediate section 50 protrudes inwardly so as to conform to the profile of the core C' forwardly of the outlet aperture 40. A closure button B' similar to that described hereinabove in conjunction with Figures 1 through 3 is molded or otherwise attached to the intermediate portion 50 of the sealing member S' so as to be in alignment with the outlet aperture 40 and the seat 42.

In the operation of this second form of check valve, whenever the pressure of the fluid on the exterior or downstream side of the check valve exceeds that existing within the fluid passage 39 of the core C', the flexible member S' will be maintained in its solid outline position of Figure 6. In such position, the lips 46 and 48 are tightly pressed together so as to prevent any backflow towards the fluid passage 39. Additionally, the closure button B' is seated tightly within its seat 42. Accordingly, extrusion or squeezing of the intermediate section 50 of the sealing members S' into the outlet aperture 40 is positively prevented. When the fluid pressure in the fluid passage 39 exceeds that existing exteriorly of the check valve, outward flow through the aperture 40 will take place. As indicated in Figure 5 and in phantom line in Figure 6, such outward flow will lift the closure button B' off its seat 42 and will expand the lips 46 and 48 so as to permit outward flow of the fluid.

Referring now to Figures 7 and 8 there is shown a third form of check valve embodying the present invention. In this form of check valve, the core C'' is formed with an axially extending fluid passage 50. The front end of the core C'' terminates in an angular wall 52, the fluid passage 50 extending through this end wall so as to define an outlet aperture 54. The outlet aperture 54 is normally closed by a flapper 56, the upper portion of which is rigidly affixed as by welding to the top of the end wall 52. The flapper 56 should be formed of a material such as spring steel whereby in its relaxed condition it will closely abut the end wall 52, as indicated solid outline in Figure 7. Thus, the end wall 52 serves as a seat for the flapper 56.

The rear portion of the sealing member S'' is generally tubular in configuration whereby it may telescopically encompass the core C''. In its relaxed position the sealing member S'' will assume its solid outline position of Figure 7, and referring thereto it will be seen that the front portion of the sealing member S'' is formed with a pair of sealing lips 58 and 60 which in their relaxed position closely abut one another. The intermediate section 62 of the sealing member S'' tapers downwardly and forwardly so as to overlie the core member's end wall 52 and the flapper 56. The parts of the check valve will remain in a sealing position so long as the fluid pressure exteriorly thereof exceeds the pressure within the fluid passage 50. Referring now to Figure 8, when the fluid pressure within the fluid passage 50 exceeds that of the fluid encompassing the check valve outward flow through the outlet aperture 54 will take place. Such outward flow will lift the flapper 56 from the end wall 52 while the lips 58 and 60 are flexed apart so as to permit this outward fluid flow through the aperture 54, as indicated by phantom outline in Figure 7 and by solid outline in Figure 8. It should be noted at such time as the check valve is in a closed position the flapper 56 positively prevents extrusion of the sealing member S'' into the outlet aperture 54.

It should be particularly observed that each of the aforedescribed forms of check valve is especially adapted for use with fluids containing solid, such as sand or grit. This is true because even should such solid particles become lodged between the pairs of sealing lips, the material of these lips will be sufficiently pliable to effect a sealing of the area surrounding each of the particles. The particles so trapped will be flushed forwardly through the sealing lips upon subsequent outward flow of fluid therethrough.

Various modifications and changes may be made with respect to the foregoing description without departing from the spirit of the invention or the scope of the following claims.

We claim:

1. A check valve, comprising: a core formed with a fluid passage, a wall, and an annular outlet aperture formed in said wall so as to connect said fluid passage with the exterior of said core, said wall also being formed with an inwardly-cupped ring-like seat coaxial with the external side of said aperture; a flexible sealing member attached to said core and formed with self-closing sealing lips which open to permit outward flow of fluid from said passage through said outlet aperture, said lips closing upon the discontinuance of said flow to prevent any backflow through said outlet aperture; and a closure button supported by said sealing member in alignment with said seat, said closure button including a disc having a peripheral edge which is curved complementary in profile to the curvature profile of said seat, said closure button moving outwardly away from said seat during outward fluid flow through said aperture and returning to engagement with said seat so as to cover said aperture when the fluid pressure on the exterior of said sealing member exceeds that existing within said fluid passage so as to prevent extrusion of said sealing member into said aperture.

2. A check valve, comprising: a core formed with a fluid passage, a wall, and an annular outlet aperture formed in said wall so as to connect said fluid passage with the exterior of said core, said wall also being formed with an inwardly-cupped ring-like seat coaxial with the external side of said aperture; an elastic sealing member attached to said core and formed with self-closing sealing lips which open to permit outward flow of fluid from said passage through said aperture, said lips closing upon the discontinuance of said flow to prevent any backflow through said aperture, said lips being in abutting relationship when said sealing member is in its relaxed position; and a closure button supported by said sealing member in alignment with said seat, said closure button including a disc having a peripheral edge which is curved complementary in profile to the curvature profile of said seat, said closure button moving outwardly away from said seat during outward fluid flow through said aperture and returning to engagement with said seat so as to cover said aperture when the fluid pressure on the exterior of said sealing member exceeds that existing within said fluid passage so as to prevent extrusion of said sealing member into said aperture.

3. A check valve, comprising: a generally tubular core having one end connectible to a source of fluid and its opposite end formed with a plurality of radially inwardly and axially extending walls; an outlet aperture formed in each of said walls so as to connect the interior of said core with its exterior; a flexible sealing member having a tubular rear portion affixed to said core, a radially inwardly and axially tapered intermediate portion covering said walls and a front portion formed with a plurality of pairs of sealing lips corresponding to the number of said walls; and a plurality of closure elements each being supported in alignment with one of said apertures, said closure elements moving away from said apertures during outward fluid flow therethrough and returning towards said core so as to cover said apertures when the fluid pressure on the exterior of said sealing member exceeds that on the interior thereof so as to prevent extrusion of said sealing member into said apertures.

4. A check valve, comprising: a generally tubular core having one end connectible to a source of fluid and its opposite end formed with a plurality of radially inwardly and axially extending walls; an outlet aperture formed in each of said walls so as to connect the interior of said core with its exterior; an elastic sealing member having a tubular rear portion affixed to said core, a radially inwardly and axially tapered intermediate portion covering said walls and a front portion formed with a plurality of pairs of sealing lips corresponding to the number of said walls, the lips of each of said pairs being in abutting relationship when said sealing member is in its relaxed position; and a plurality of closure elements, each being supported by the intermediate portion of said sealing member in alignment with one of said apertures, said closure elements moving away from said apertures during outward fluid flow therethrough and returning towards said core so as to cover said apertures when the fluid pressure on the exterior of said sealing member exceeds that on the interior thereof so as to prevent extrusion of said sealing member into said apertures.

5. A check valve, comprising: a generally tubular rigid core having one of its ends connectible with a source of fluid and its opposite end formed with a plurality of radially inwardly and axially inclined walls; an annular outlet aperture formed in each of said walls, said walls also being formed with inwardly-cupped ring-like seats coaxial with the external side of each of said apertures; a flexible sealing member having a tubular rear portion affixed to said core, a radially inwardly and axially tapered intermediate portion covering said walls and a front portion formed with a plurality of pairs of sealing lips corresponding to the number of said walls; and a plurality of closure buttons, each supported by the intermediate portion of said sealing member in alignment with one of said seats, each of said closure buttons including a disc having a peripheral edge which is curved complementary in profile to the curvature profile of its seat, said closure button moving outwardly away from its seat during outward fluid flow through said aperture and returning to engagement with its seat so as to cover its respective aperture when the fluid pressure on the exterior of said sealing member exceeds that within said core.

6. A check valve, comprising: a generally tubular hollow rigid core formed with an axially extending fluid passage, said passage terminating in an inclined outlet aperture adjacent the front portion of said core, said core being formed with an inwardly-cupped ring-like seat coaxial with the external side of said aperture; a forwardly and radially outwardly tapered scoop formed on the front of said core; a flexible sealing member having a generally tubular rear portion that telescopically encompasses said core, a front portion formed with a pair of sealing lips and an intermediate portion that protrudes radially inwardly so as to conform to the profile of said core adjacent said aperture; and a closure element supported by said sealing member in alignment with said outlet aperture, said closure element including a disk having a peripheral edge which is curved complementary in profile to the curvature profile of said seat, said closure element moving away from said outlet aperture during outward fluid flow therethrough and moving against said core so as to cover said outlet aperture when the fluid pressure on the exterior of said sealing member exceeds that existing within said fluid passage so as to prevent extrusion of said sealing member into said outlet aperture.

7. A check valve, comprising: a core formed with a fluid passage, a wall, and an outlet aperture in said wall that connects said fluid passage with the exterior of said core, said wall also being formed with a seat that encompasses the external side of said aperture; an elastic sealing member attached to said core and formed with self-closing sealing lips which open to permit outward flow of fluid from said passage through said outlet aperture, said lips automatically closing upon the discontinuance of said flow to prevent any backflow through said outlet aperture; and a rigid closure button supported in alignment with said seat, said closure button moving away from said seat with said sealing member during outward fluid flow therethrough and said closure button returning to and engaging said seat so as to cover said aperture when the fluid pressure on the exterior of said sealing member exceeds that existing within said fluid passage so as to prevent extrusion of said sealing member into said aperture.

References Cited in the file of this patent
UNITED STATES PATENTS

| Number | Name | Date |
|---|---|---|
| 187,411 | Painter | Feb. 13, 1877 |
| 810,502 | Nolan | Jan. 23, 1906 |
| 1,515,645 | Yablick | Nov. 18, 1924 |
| 1,930,040 | Crowley | Oct. 10, 1933 |
| 1,969,118 | Brucker | Aug. 7, 1934 |
| 2,355,862 | Harper | Aug. 15, 1944 |